US012298559B2

(12) United States Patent
Schrans et al.

(10) Patent No.: US 12,298,559 B2
(45) Date of Patent: May 13, 2025

(54) OPTOELECTRONIC DEVICE

(71) Applicant: ROCKLEY PHOTONICS LIMITED, Altrincham (GB)

(72) Inventors: Thomas Pierre Schrans, Temple City, CA (US); Amit Singh Nagra, Altadena, CA (US); Albert Benzoni, Pasadena, CA (US); Andrew George Rickman, Marlborough (GB)

(73) Assignee: Rockley Photonics Limited, Altrincham (GB)

( * ) Notice: Subject to any disclaimer, the term of this patent is extended or adjusted under 35 U.S.C. 154(b) by 192 days.

(21) Appl. No.: 18/056,195

(22) Filed: Nov. 16, 2022

(65) Prior Publication Data
US 2023/0280532 A1 Sep. 7, 2023

(30) Foreign Application Priority Data
Nov. 17, 2021 (GB) .................................. 2116568.3

(51) Int. Cl.
*G02B 6/13* (2006.01)
*G02B 6/12* (2006.01)
(Continued)

(52) U.S. Cl.
CPC ........... *G02B 6/13* (2013.01); *G02B 6/12004* (2013.01); *G02B 6/4286* (2013.01); *G02F 1/015* (2013.01);
(Continued)

(58) Field of Classification Search
CPC .... G02B 6/12004; G02B 6/13; G02B 6/4286; G02B 2006/12061; G02B 2006/12104;
(Continued)

(56) References Cited

U.S. PATENT DOCUMENTS 5,404,006 A * 4/1995 Schaffner ............... H04B 10/69
257/E31.066
6,239,422 B1 5/2001 Vang et al.
(Continued)

FOREIGN PATENT DOCUMENTS

EP 0 613 182 A2 8/1994
WO WO 01/37016 A1 5/2001

OTHER PUBLICATIONS

U.K. Intellectual Property Office Search and Examination Report, dated Mar. 28, 2022, for Patent Application No. GB2116568.3, 9 pages.
(Continued)

*Primary Examiner* — Daniel Petkovsek
(74) *Attorney, Agent, or Firm* — Womble Bond Dickinson (US) LLP (57) ABSTRACT

An optoelectronic device. The device comprising: an input waveguide, which receives an optical signal; a multistage photodiode detector, comprising a plurality of photodiode elements connected in series, one of the photodiode elements of the plurality of photodiode elements being connected to the input waveguide and configured to receive the optical signal therefrom; and a first electrode and a second electrode, wherein the first electrode is connected to a first contact of each of the plurality of photodiode elements, and the second electrode is connected to a second contact of each of the plurality of photodiode elements.

14 Claims, 5 Drawing Sheets

(51) Int. Cl.
  *G02B 6/42* (2006.01)
  *G02F 1/015* (2006.01)
  *G02F 1/025* (2006.01)
(52) U.S. Cl.
  CPC ............ *G02F 1/0155* (2021.01); *G02F 1/025* (2013.01); *G02B 2006/12061* (2013.01); *G02B 2006/12104* (2013.01); *G02B 2006/12123* (2013.01); *G02B 2006/1215* (2013.01); *G02B 6/4249* (2013.01)
(58) Field of Classification Search
  CPC .. G02B 2006/12123; G02B 2006/1215; G02F 1/015; G02F 1/0155; G02F 1/025
  See application file for complete search history.

(56) References Cited

U.S. PATENT DOCUMENTS

| | | | |
|---|---|---|---|
| 6,418,248 B1 * | 7/2002 | Hayes | H04B 10/697 |
| | | | 250/208.2 |
| 9,406,832 B2 * | 8/2016 | Fujikata | H01L 31/02327 |
| 2006/0039666 A1 | 2/2006 | Knights et al. | |
| 2016/0277119 A1 | 9/2016 | Sinsky et al. | |
| 2018/0261591 A1 | 9/2018 | Lin et al. | |

OTHER PUBLICATIONS

U.K. Intellectual Property Office Examination Report, dated Jan. 14, 2025, for Patent Application No. GB2116568.3, 4 pages.

* cited by examiner

OPTOELECTRONIC DEVICE

CROSS-REFERENCE TO RELATED APPLICATION(S)

This application claims priority to United Kingdom Patent Application No. 2116568.3, filed in the United Kingdom Intellectual Property Office on Nov. 17, 2021, entitled "OPTOELECTRONIC DEVICE", which is incorporated by reference herein in its entirety.

FIELD OF THE INVENTION

The present invention relates to an optoelectronic device.

BACKGROUND

In order to simplify and reduce the cost of manufacturing optoelectronic devices, it is desirable to have several active components (e.g. an electro-absorption modulator, laser, and a corresponding power monitor photodiode detector) made out of the same material or at least the same material system.

Typically, however, using the same materials would result in either an inefficient modulator, inefficient laser, or an inefficient photodiode as the materials can only be optimised for one of the components. This is because high speed (e.g. 10 s or GHz) EAM modulators need to be small and short in optical length. The performance of an EAM is defined in relation to how much of the light is modulated. The generated photocurrent is only a secondary consideration.

Whereas photodiodes should be as efficient as possible in converting light into photocurrent. Speed is not important for photodiodes (kHz to MHz is more than sufficient for most uses) and so they can be longer in optical length.

A further consideration is that EAM modulators typically operate at a wavelength near, but slightly longer than, the bandgap, as minimising the transmission loss under modulation is a key consideration. Whereas, photodiodes typically operate at wavelengths shorter than the bandgap in order to maximise the absorption efficiency and conversion to photocurrent.

Therefore photodiodes operating at a wavelength optimized for an EAM modulator will have a degraded absorption efficiency, and moreover the total absorption will depend on wavelength, temperature, and bias voltage. This type of photodiode can be successful, if it is made long enough so that the light signal is converted to photocurrent with a net efficiency which is independent of wavelength, temperature, and bias voltage.

However implementation of long photodiodes is difficult, particularly in implementations of silicon based photonic integrated circuits with integrated silicon germanium epitaxially grown active waveguides. This type of integration generally has a size limitation on the silicon germanium elements.

SUMMARY

Accordingly, in a first aspect, embodiments of the present invention provide an optoelectronic device comprising:
an input waveguide, which is configured to receive an optical signal;
a multistage photodiode detector, comprising a plurality of photodiode elements connected in series, one of the photodiode elements of the plurality of photodiode elements being connected to the input waveguide and configured to receive the optical signal therefrom; and
a first electrode and a second electrode, wherein the first electrode is connected to a first contact of each of the plurality of photodiode elements, and the second electrode is connected to a second contact of each of the plurality of photodiode elements.

Accordingly, such a multistage photodiode detector can be formed from the same material or material system as other components of a photonic integrated circuit in which the multistage photodiode detector may be integrated.

The optoelectronic device may have any one or, to the extent that they are compatible, any combination of the following optional features.

Each photodiode element may comprise a p-i-n junction extending across a waveguide. The first contact of each of the plurality of photodiode elements may be an n+ doped region, and the second contact of each of the plurality of photodiode elements may be a p+ doped region. Alternatively, each photodiode element may comprise a p-n junction extending across a waveguide. Again, the first contact of each of the plurality of photodiode elements may be an n+ doped region, and the second contact of each of the plurality of photodiode elements may be a p+ doped region. The plurality of photodiode elements may comprise a mixture of p-n and p-i-n junctions.

Each photodiode element may be located within a cavity of a silicon-on-insulator wafer. Each photodiode element may be an epitaxially formed photodiode element, i.e. one formed of an epitaxial crystalline structure. By cavity, it may be meant a region of the silicon-on-insulator wafer which has been previously removed (and may be subsequently filled, e.g. with a different material via epitaxy).

The optoelectronic device may comprise a plurality of passive waveguides, each of which may connect a pair of the plurality of photodiode elements. Each passive waveguide may be formed from silicon. For example, each passive waveguide may be a silicon waveguide within a silicon device layer (or silicon-on-insulator layer) of a silicon-on-insulator wafer.

A final photodiode element of the plurality of photodiode elements may be connected at a terminating end to a high reflectivity mirror. Accordingly, the total number of photodiode elements may be reduced, as the optical signal can pass through the same photodiode element multiple times. By terminating end, it may be meant an end of the waveguide of the photodiode element which does not then go on to connect to a further photodiode element.

A passive waveguide, located between a pair of the plurality of photodiode elements, may have a U-shape. By 'U-shaped' it may be meant that the passive waveguide comprises a first straight section, a curved connecting section, and a second straight section, where the curved connection section includes a 180° curve. Accordingly, the total footprint of the multistage photodiode detector can be reduced, as the length can be reduced. The first electrode and the second electrode may each have a U-shape. The legs of the first and second electrode may lie adjacent to one another, with the 'bars' of each U-shaped electrode being distal to one another. The two U-shaped electrodes may partially overlap, in that a leg of one is positioned between the legs of the other. Pairs of the plurality of photodiode elements which are spatially adjacent may be located within a same cavity of a silicon-on-insulator wafer. By spatially adjacent, it may be meant those photodiode elements which are adjacent in a direction transversal to the guiding direction of the photodiode elements. The adjacent photodiode elements may be those which are not directly optically coupled, save for a pair which are directly coupled via the U-shaped passive waveguide.

The input waveguide may be connected to a splitter, a first output of the splitter may be connected to a first photodiode element and a second output of the splitter may be connected to a second photodiode element.

The first photodiode element may be part of a first sub-group of the plurality of photodiode elements and the second photodiode element may be part of a second sub-group of the plurality of photodiode elements, and a final photodiode element of the first sub-group may be connected to a final photodiode element of the second sub-group via a U-shaped passive waveguide.

The first photodiode element may be part of a first sub-group of the plurality of photodiode elements and the second photodiode element may be part of a second sub-group of the plurality of photodiode elements, and a final photodiode element of the first sub-group may be connected at a terminating end to a first high reflectivity mirror and a final photodiode element in the second sub-group may be connected at a terminating end to a second high reflectivity mirror.

The input waveguide may be formed from silicon, and the photodiode elements may be formed from silicon germanium. The photodiode elements may each comprise an active waveguide, which is formed from silicon germanium.

The optoelectronic device may be a power monitor. The optoelectronic device may be a power monitor for an electro-absorption modulator. The optoelectronic device may be a power monitor for a laser. The optoelectronic device may be connected to the laser after the laser and before an electro-absorption modulator. The optoelectronic device may be connected to a low percentage tap.

In a second aspect, embodiments of the invention provide an array comprising a plurality of the power monitors of the first aspect, wherein each power monitor is connected to a respective laser or electro-absorption modulator.

In a third aspect, embodiments of the invention provide a method of monitoring a power output of a laser or an electro-absorption modulator, using the power monitor of the first aspect, the method comprising the steps of:
  providing a signal from the laser or electro-absorption modulator to the input waveguide; and
  detecting, using the multistage photodiode detector, a power level of the signal.

The signal may be received from a low percentage tap. By low percentage tap, it may be meant a tap coupler which couples a relatively low percentage (e.g. less than 10%, less than 5%, or less than 1%) of a signal output from the laser or electro-absorption modulator into the input waveguide of the power monitor.

In a fourth aspect, embodiments of the invention provide a photonic integrated circuit for use as a transmission device, the photonic integrated circuit comprising the array of the second aspect.

Further aspects of the present invention provide: a computer program comprising code which, when run on a computer, causes the computer to perform the method of the third aspect; a computer readable medium storing a computer program comprising code which, when run on a computer, causes the computer to perform the method of the third aspect; and a computer system programmed to perform the method of the third aspect.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
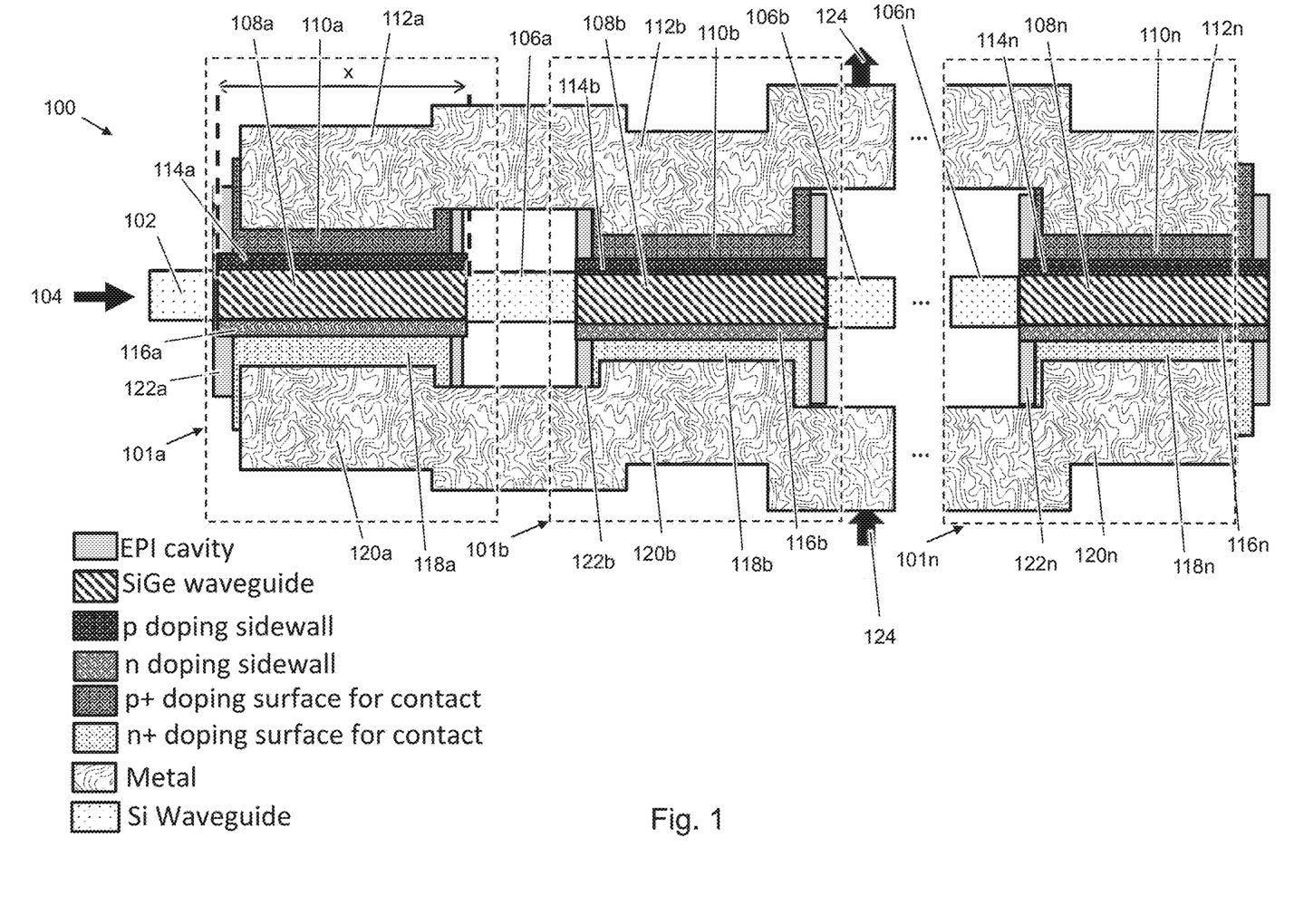
FIG. 1 is a top view of an optoelectronic device.

Aspects and embodiments of the present invention will now be discussed with reference to the accompanying figures. Further aspects and embodiments will be apparent to those skilled in the art. All documents mentioned in this text are incorporated herein by reference FIG. 1 is a top view of an optoelectronic device 100. The device comprises an input waveguide 102, which receives an optical signal 104. This optical signal can be, for example, from a tap on a laser output or a modulator, so as to monitor the power output of the laser or modulator.

The device 100 also includes a plurality of photodiode elements 101a, 101b, etc. to 101n, which combined form a multistage photodiode detector. The first photodiode element 101a is connected to the input waveguide at a first end, and to a passive waveguide 106a at a second end. The passive waveguide connects photodiode element 101a to the adjacent photodiode element 101b. Similarly, passive waveguide 106b connects photodiode element 101b to the next photodiode element, and so on.

A first electrode connects to a first contact of each of the photodiode elements. For example, a first contact 120a of the electrode connects to a portion of the first photodiode element 101a. Similarly, a second contact 120b of the electrode connects to a same portion of the second photodiode element 101b. A second electrode connects to a first contact of each of the photodiode elements. For example, a first contact 112a of the electrode connects to a portion of the first photodiode element 101a. Similarly, a second contact 112b of the electrode connects to a same portion of the second photodiode element 101b.

Each photodiode element comprises a cavity 122a, etched into a silicon-on-insulator wafer. The input waveguide 102 and passive waveguides 106a-106n are silicon waveguides formed in the silicon-on-insulator (or silicon device layer) of the silicon-on-insulator wafer, and are themselves formed from silicon. The depth of each cavity 122a is such that an active waveguide 108a-108n of each photodiode element is aligned with the adjacent passive waveguides.

The active waveguides 108a-108n are formed from silicon germanium (SiGe), and comprise a ridge or rib region in the centre and a slab region on either lateral side of the ridge or rib (lateral being a direction typically perpendicular to the guiding direction of the waveguide). Each ridge or rib includes an n doped sidewall 116a-n and a p doped sidewall 114a-n. A centre portion of each ridge or rib is undoped or only unintentionally doped, and so the ridge or rib forms a P-I-N junction and thereby operates as a photodiode when connected to electrodes. In an alternative embodiment, not shown, the ridge or rib is entirely doped and so forms a P-N junction.

The p doped sidewall 114a-n is connected to a p+ doped region 110a-n of the respective slab. By p+, it is meant that the region of the slab is doped to a dopant concentration level higher than the respective p doped sidewall 114a-n. Similarly, then doped sidewall 116a-n is connected to an n+ doped region 118a-n of the respective slab. By n+, it is meant that the region of the slab is doped to a dopant concentration level higher than the n doped sidewall 116a-n.

The electrode contacts 120a-n and 112a-n connect to the p+ and n+ doped regions of the respective slab. The increased dopant concentration in the p+ and n+ doped regions reduces series resistance in the connections to the electrodes.

In use, the optical signal 104 is passed from the input waveguide 102 to the first photodiode element 101a. The P-I-N or P-N junction in the photodiode element 101a then partially converts the optical signal to an electrical current 124, which is read from the photodiode element. The partially converted optical signal then passes along the passive waveguide 106a to the second photodiode element 101b, which also partially converts the optical signal, and so on.

A last photodiode element 101n terminates with the end of the active waveguide 106n, and so the number of photodiode elements should be chosen so as to ensure optimum power monitoring. n may take a value of between 2 and 5, typically fewer elements will be used if a mirror is provided at the end of the optoelectronic device (as discussed below).

As a result, despite the photodiode elements having not been individually optimised, an accurate power reading can be taken from the optoelectronic device to which the photodiode elements are connected. Moreover, this can be achieved given the restraints discussed above relating to the choice of material system, and also the maximum length 'x' of the cavities 122a.

Figure 2:
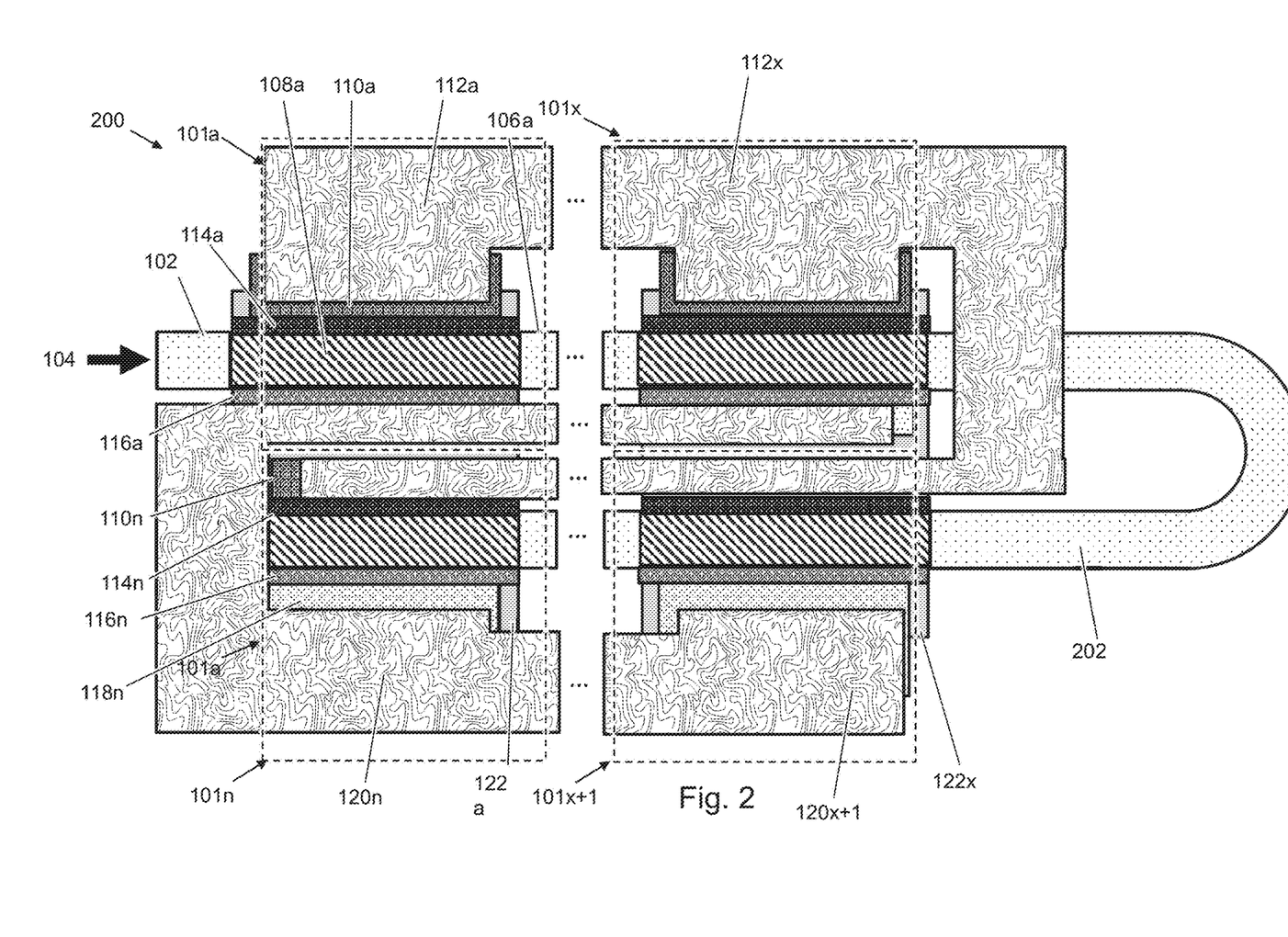
FIG. 2 is a top view of a variant optoelectronic device.

FIG. 2 is a top view of a variant optoelectronic device 200. Where the device 200 shares features with the device 100, like features are indicated by like reference numerals. As before, the device comprises a plurality of photodiode elements 101a-101n. However, in contrast to the device 100, one of the passive waveguides 202 between a pair (101x and 101x+1) of photodiode elements has a U-shape. Therefore light passing through the multistage photodiode detector initially travels in a first direction (from the input waveguide 102 in the direction indicated by arrow 104) before passing through an approximately 180° turn, and so traveling in a second direction antiparallel to the first.

Moreover, each cavity 122 in device 200 is wider than the cavities in device 100. This is because a pair of photodiode elements (e.g. 101a and 101n or 101x and 101x+1) reside in each. In an alternative example, the cavities 122 in device 200 are the same width as the cavities in device 100 e.g. because the cavities in device 100 are oversized.

These differences allows the overall footprint of the multistage photodiode detector to be reduced. Moreover, each of the first 112 and second 120 electrodes can have a U-shape (one rotated 180° relative to the other). The U-shaped electrodes overlap in that a 'leg' (i.e. the elongate members extending parallel to the active waveguides 108a-108n) from each of the U-shaped electrodes are adjacent to one another, so as to further reduce the footprint of the multistage photodiode detector. Said another way, the footprint of the U-shaped electrodes overlaps in that the 'leg' of one U-shaped electrode sits within the bend of U of another.

Figure 3:
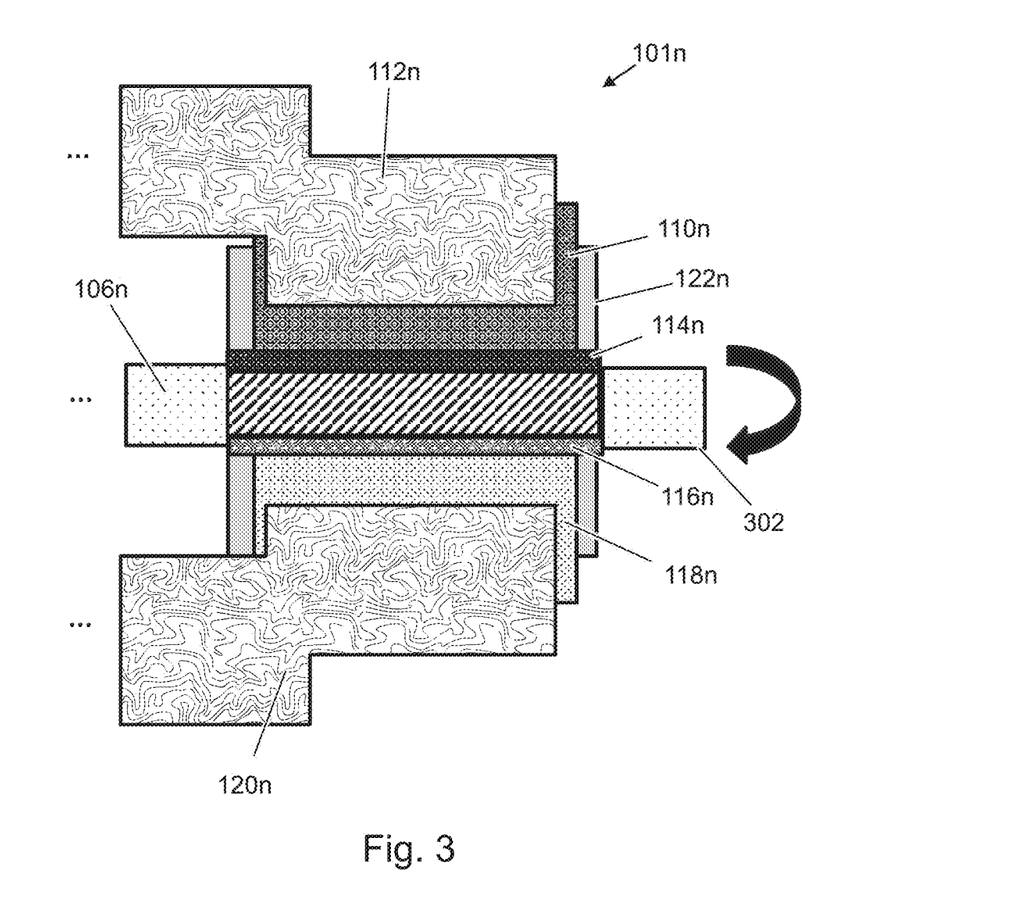
FIG. 3 is a top view of an end photodiode element.

FIG. 3 is a top view of a variant end photodiode element 101n. Where it shares features with the photodiode elements discussed previously, like features are indicated by like reference numerals. In contrast to the end photodiode elements shown in FIGS. 1 and 2, the photodiode element 101n in FIG. 3 terminates in high reflectivity mirror 302. This could be, for example, a facet (e.g. etched facet) with HR (high reflectivity) coating or a Sagnac reflector (also known as a Sagnac loop reflector, Sagnac mirror, or Sagnac loop mirror). This high reflectivity mirror causes the signal passing through the multistage photodiode detector to perform a double pass through the detector and so the overall number of elements can be reduced (as each is used twice).

Figure 4:
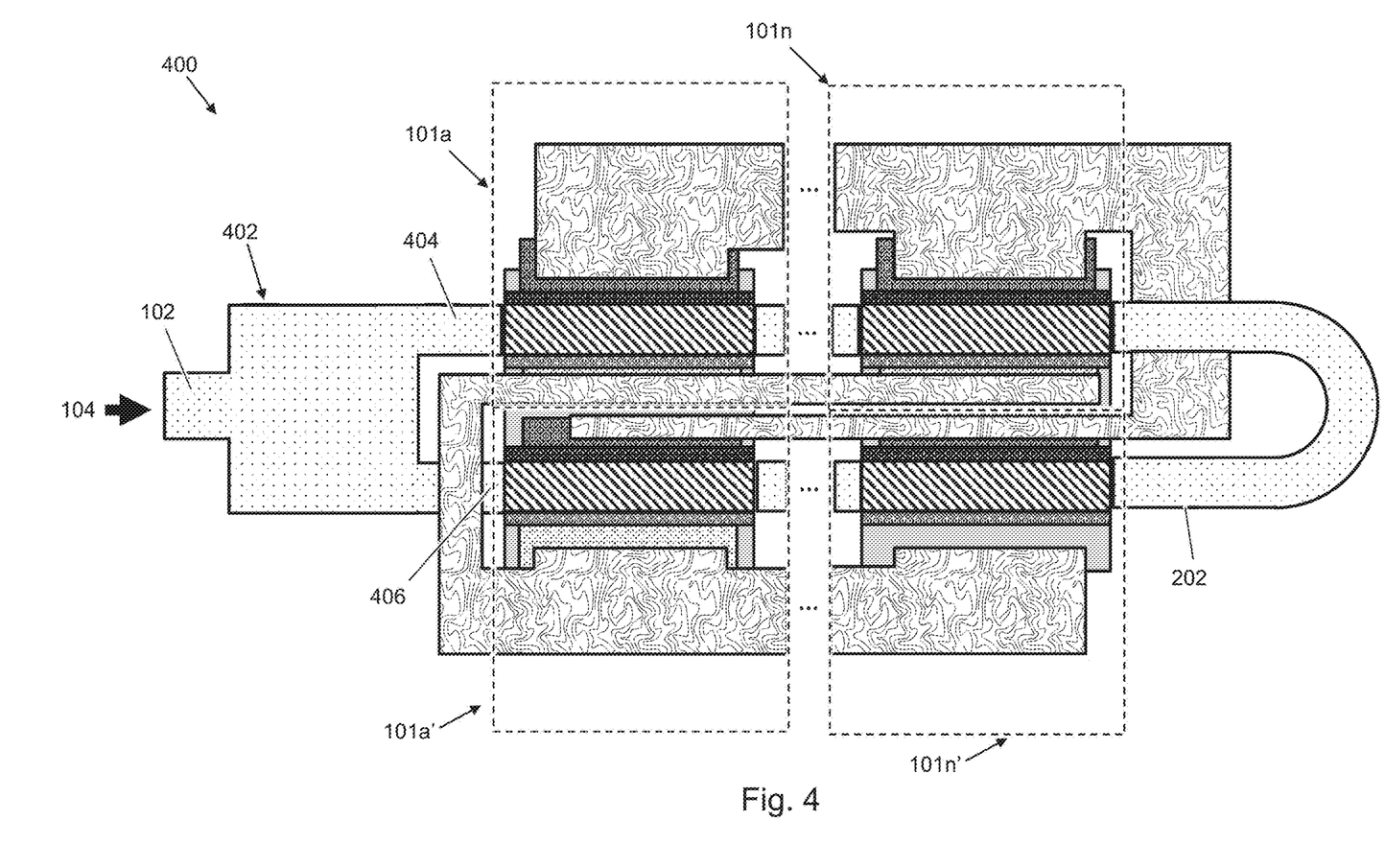
FIG. 4 is a top view of a variant optoelectronic device.

FIG. 4 is a top view of a variant optoelectronic device 400. Where the device 400 shares features with the devices 100 and 200 shown previously, like features are indicated by like reference numerals. The device 400 differs from those shown previously in that input waveguide 102 does not connect directly to any photodiode element of the multistage photodiode detector. Instead, the input waveguide 102 connects to a splitter 402, for example a multi-mode interference splitter (MMI) which divides the signal and provides outputs at a first output 404 and a second output 406.

The first output 404 is connected to a first photodiode element 101a of a first sub-group of the plurality of photodiodes. The second output 406 is connected to a first photodiode element 101a' of a second sup-group of the plurality of photodiodes. In this way, light is provided to both the first and second sub-groups of the plurality of photodiodes. Thereafter each sub-group can be considered its own multistage photodiode detector.

In the example shown in FIG. 4, the end photodiode elements 101n and 101n' of each sub-group are connected via a U-shaped waveguide 202. Therefore any residual optical signal, which has not yet been converted to photocurrent in the preceding sub-group of photodiode elements, will then travel back towards the input waveguide and so pass through the other sub-group of photodiode elements and so be converted to photocurrent.

Figure 5:
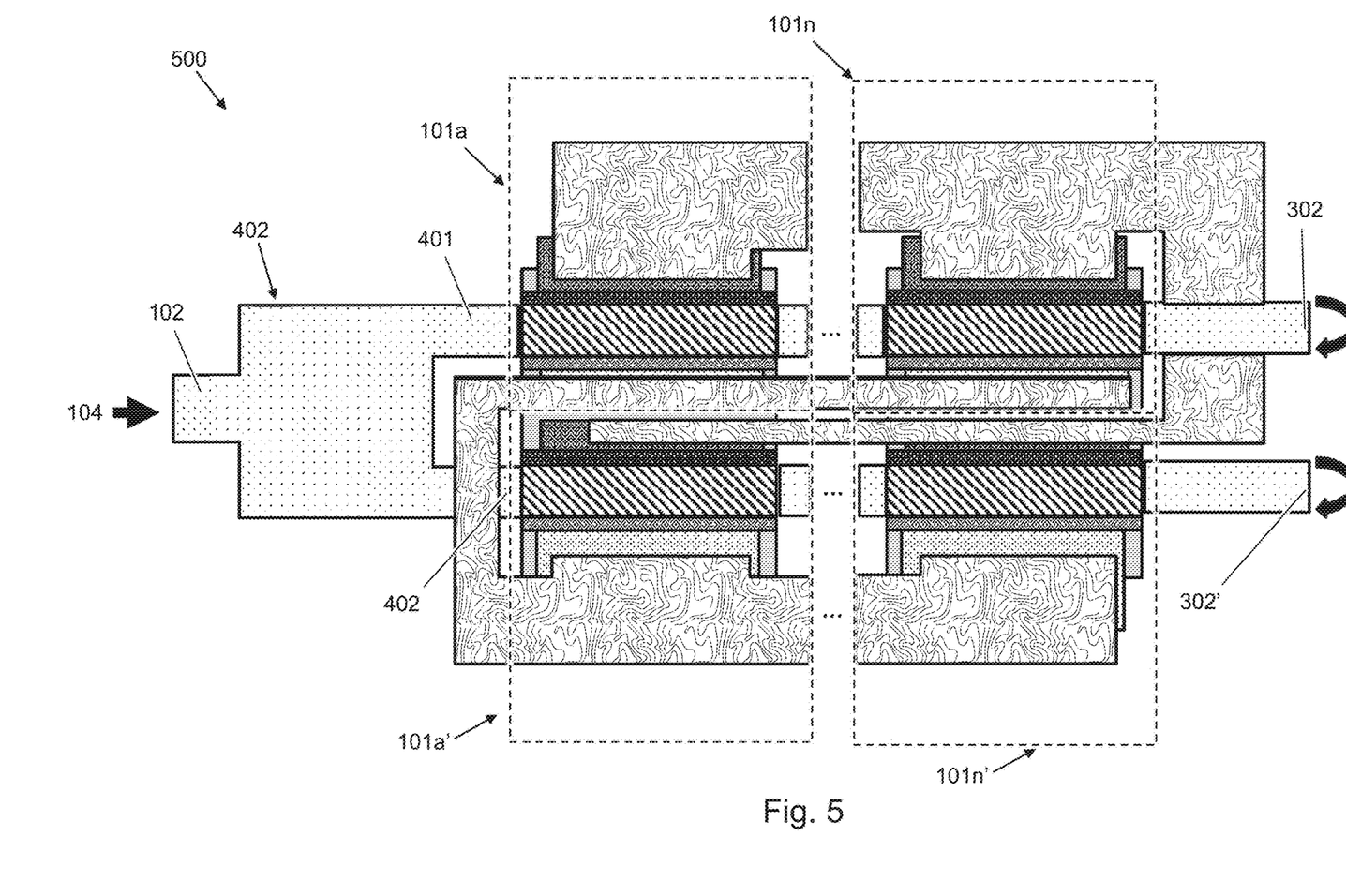
FIG. 5 is a top view of a variant optoelectronic device.

FIG. 5 is a top view of a variant optoelectronic device 500. Where the device 500 shares features with the devices 100, 200, and 400 shown previously, like features are indicated by like reference numerals. The device 500 in FIG. 5 differs from the device 400 in FIG. 4 in that the end photodiode elements 101n and 101n' of each sub-group do not connect to each other via a U-shaped waveguide. Instead, each terminates in a high reflectivity mirror 302 and 302' in the same manner as the end photodiode element shown in FIG. 3. Therefore after passing through all of the photodiode elements in a given sub-group, any residual optical signal is reflected back through the same sub-group towards the input waveguide.

The devices 100, 200, 400, and 500, can be disposed in an array, each connected to a respective tap on a laser output or electro-absorption modulator and so the power of different signals (e.g. different wavelengths, or on different channels) can be monitored.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

LIST OF FEATURES

100 Optoelectronic device
101n Photodiode element
102 Input waveguide
104 Optical signal
106n Passive waveguide
108n Active waveguide
110n p+ doped region
112n Contact
114n p doped region of active waveguide
116n n doped region of active waveguide
118n n+ doped region
120n Contact 122n Cavity
124 Photocurrent
202 U-shaped passive waveguide
302 High reflectivity mirror
400 Splitter
401 First splitter output
402 Second splitter output

The invention claimed is:

1. A power monitor comprising:
a silicon-on-insulator wafer comprising a silicon device layer and having a plurality of cavities;
a silicon input waveguide formed in the silicon device layer, the silicon input waveguide being configured to receive an optical signal;
a plurality of silicon passive waveguides formed in the silicon device layer, each of the silicon passive waveguides being between a respective adjacent pair of the cavities;
a multistage photodiode detector, comprising a plurality of photodiode elements connected in series, one of the photodiode elements of the plurality of photodiode elements being connected to the silicon input waveguide and configured to receive the optical signal therefrom, each of the plurality of photodiode elements comprising an active waveguide in a respective one of the plurality of cavities and aligned with an adjacent one of the silicon passive waveguides, the active waveguide comprising an epitaxial crystalline material different from silicon and having a ridge or rib and a slab region on either lateral side of the ridge or rib, the ridge or rib comprising an n doped sidewall and a p doped sidewall, and the slab region comprising a p+ doped region, connected to the p doped sidewall and having a higher dopant concentration than the p doped sidewall, and an n+ doped region connected to the n doped sidewall and having a higher dopant concentration than the n doped sidewall;
a first electrode and a second electrode, wherein the first electrode is connected to the p+ doped region of each of the plurality of photodiode elements, and the second electrode is connected to the n+ doped region of each of the plurality of photodiode elements; and
a first high reflectivity mirror connected to a terminating end of a first final photodiode element of the plurality of photodiode elements.

2. The power monitor of claim 1, wherein each photodiode element comprises a p-i-n junction extending across the active waveguide of the photodiode element.

3. The power monitor of claim 1, wherein a silicon passive waveguide, located between a pair of the plurality of photodiode elements and formed in the silicon device layer, has a U-shape.

4. The power monitor of claim 3, wherein the first electrode and second electrode each have a U-shape.

5. The power monitor of claim 3, wherein pairs of the plurality of photodiode elements are spatially adjacent and are located within a same cavity of the cavities.

6. The power monitor of claim 1, wherein the silicon input waveguide is connected to a splitter, a first output of the splitter being connected to a first photodiode element and a second output of the splitter being connected to a second photodiode element.

7. The power monitor of claim 6, wherein the first photodiode element is part of a first sub-group of the plurality of photodiode elements and the second photodiode element is part of a second sub-group of the plurality of photodiode elements, wherein the first final photodiode element is a final photodiode element in the first sub-group, and a second final photodiode element in the second sub-group is a final photodiode element in the second sub-group and is connected at a terminating end to a second high reflectivity mirror.

8. The power monitor of claim 6, wherein the splitter is a multi-mode interference splitter.

9. The power monitor of claim 1, wherein the photodiode elements are formed from silicon germanium.

10. An array comprising a plurality of the power monitors according to claim 1, each of the power monitors being connected to a respective laser or electro-absorption modulator.

11. A photonic integrated circuit, for use as a transmission device, comprising the array of claim 10.

12. A method of monitoring a power output of a laser or of an electro-absorption modulator, using the power monitor of claim 1, the method comprising the steps of:
providing a signal from the laser or the electro-absorption modulator to the silicon input waveguide; and
detecting, using the multistage photodiode detector, a power level of the signal.

13. The method of claim 12, wherein the signal is from the laser.

14. The method of claim 12, wherein the signal is from the electro-absorption modulator.

* * * * *